United States Patent
Spitz et al.

(10) Patent No.: US 8,549,161 B2
(45) Date of Patent: Oct. 1, 2013

(54) DATA COMMUNICATION METHOD AND DATA CARRIER THEREFOR

(75) Inventors: Stephan Spitz, München (DE); Jan Eichholz, München (DE)

(73) Assignee: Giesecke & Devrient GmbH, Munich (DE)

( * ) Notice: Subject to any disclaimer, the term of this patent is extended or adjusted under 35 U.S.C. 154(b) by 377 days.

(21) Appl. No.: 12/675,143

(22) PCT Filed: Aug. 20, 2008

(86) PCT No.: PCT/EP2008/006863
§ 371 (c)(1),
(2), (4) Date: Feb. 25, 2010

(87) PCT Pub. No.: WO2009/030375
PCT Pub. Date: Mar. 12, 2009

(65) Prior Publication Data
US 2010/0313008 A1    Dec. 9, 2010

(30) Foreign Application Priority Data
Aug. 29, 2007  (DE) .......................... 10 2007 040 872

(51) Int. Cl.
*G06F 15/16*  (2006.01)

(52) U.S. Cl.
USPC .......................................... 709/230; 709/217

(58) Field of Classification Search
USPC ................................. 709/230, 217
See application file for complete search history.

(56) References Cited

U.S. PATENT DOCUMENTS 6,549,773 B1 *   4/2003  Linden et al. .............. 455/426.1
7,047,558 B1 *   5/2006  Mariana ............................ 726/3

(Continued)

FOREIGN PATENT DOCUMENTS

DE    102005032310 A1    1/2007
EP       1384370 B1       3/2005

(Continued)

OTHER PUBLICATIONS

Rees, J. and Honeyman, P., "Webcard: A Java Card Web Server", Smart Card Research and Advanced Applications. IFIP Working Conference on Smart Card Research and Advanced Applications, Sep. 20, 2000, 197-207, XP001013569.

(Continued)

*Primary Examiner* — Asghar Bilgrami
(74) *Attorney, Agent, or Firm* — Workman Nydegger (57) ABSTRACT

The invention relates to a method for the data communication between a portable data carrier (10) and an external communication device, which both in each case comprise a TCP/IP protocol stack (24). In a first step the communication device sends communication data to the data carrier (10), the communication data comprising at least commands according to an Internet protocol of the application layer of the TCP/IP reference model and commands in the form of APDUs according to ISO/IEC 7816-4. The method additionally comprises the steps of transmitting the communication data between the communication device and the data carrier (10), of receiving the communication data by the data carrier (10) and of separating the received APDUs and the received Internet protocol commands from each other by means of the allocator unit (32) of the data carrier (10). Here, the mentioned commands are transmitted by means of TCP/IP and the allocator unit (32) separates the APDUs and the Internet protocol commands not until above the transport layer of the TCP/IP reference model. This permits the APDUs and the Internet protocol commands transmitted together with said APDUs in a joint TCP/IP data stream to be separated from each other in a simple fashion.

17 Claims, 3 Drawing Sheets

(56) References Cited

U.S. PATENT DOCUMENTS

| | | | |
|---|---|---|---|
| 7,350,717 B2 * | 4/2008 | Conner et al. | 235/492 |
| 2005/0108571 A1 * | 5/2005 | Lu et al. | 713/201 |
| 2006/0079284 A1 * | 4/2006 | Lu et al. | 455/558 |
| 2006/0085848 A1 * | 4/2006 | Aissi et al. | 726/9 |
| 2008/0280644 A1 * | 11/2008 | Hugot | 455/556.2 |
| 2011/0131292 A1 * | 6/2011 | McNulty | 709/217 |

FOREIGN PATENT DOCUMENTS

| | | |
|---|---|---|
| EP | 1549021 A1 | 6/2005 |
| WO | 2006032993 A2 | 3/2006 |

OTHER PUBLICATIONS

Tuai., J.P. et al., "USB Full Speed Enabled Smart Cards for Consumer Electronics Applications", Consumer Electronics, 2005 (ISCE2005). Proceedings of the Ninth International Symposium on Macau SAR Jun. 14-16, 2005, Piscataway, NJ, USA, IEEE, pp. 230-236, XP010832150.

International Search Report in PCT/EP2008/006863, Feb. 23, 2009.

Search Report of German Patent Office regarding German Patent Application 10 2007 040 872.4, Feb. 29, 2008/.

* cited by examiner

| OSI reference model | TCP/IP reference model | Protocol examples |
|---|---|---|
| application layer | application layer | HTTP, FTP, SMTP, SSH |
| presentation layer | | |
| session layer | | |
| transport layer | transport layer | TCP, UDP |
| network layer | Internet layer | IPv4, IPv6 |
| data link layer | link layer | Ethernet, Token Ring, USB |
| physical layer | | |

DATA COMMUNICATION METHOD AND DATA CARRIER THEREFOR

FIELD OF THE INVENTION

The present invention relates to a method for the data communication between a portable data carrier and an external communication device as well as a data carrier set up accordingly. The invention in particular relates to the data communication with a chip card which processes both APDUs according to ISO/IEC 7816-4 and Internet protocol commands and is provided with a TCP/IP protocol stack.

BACKGROUND

The data communication between a reading device and a chip card application on a chip card takes place with the help of so-called APDUs ("application protocol data unit") according to ISO/IEC 7816-4. An APDU is a standardized data unit for an application protocol command. It can be assigned to the application layer of the OSI reference model.

The OSI reference model ("open systems interconnection reference model") is a layer model of the International Organization for Standardization (ISO). It has been developed as a general basis for designing communication protocols for the data communication via any network and between any desired systems. For this purpose the abstract tasks of the data communication are functionally divided into seven layers. For each layer there is a description of the layer's tasks. A communication protocol in each case has to fulfill only the tasks of one layer. For this there are no specific directions as to the solution of the particular task.

According to the basic idea of the OSI reference model a data communication is carried out between two systems in such a way that a communication protocol of a layer uses the services of communication protocols of the layer located directly therebelow and in turn provides its services to the communication protocols of the next higher layer. This allows a layer to abstract from the details processed by the layers therebelow.

Figure 4:
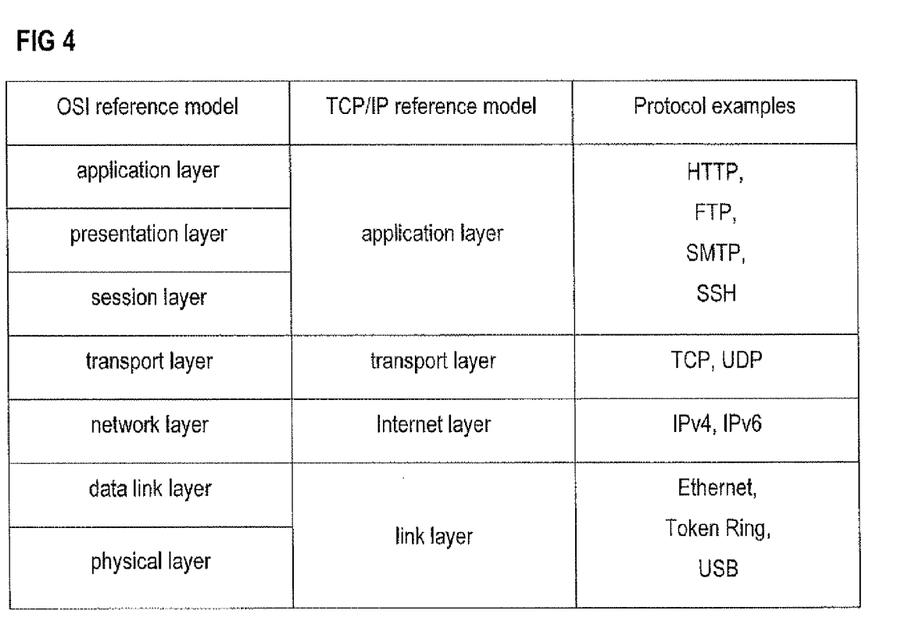
FIG. 4 shows the layers according to the OSI reference model in comparison with the layers of the TCP/IP reference model.

The seven layers of the OSI reference model in the following are briefly sketched with reference to FIG. 4.

The application layer is the top-most layer of the seven layers. Applications of a system are considered to lie above the application layer. The application layer itself includes communication protocols which provide a multiplicity of functionalities to the system's applications, for example for the data transmission to other systems, for emailing and the like. Communication protocols of the application layer are e.g. HTTP, FTP, SSH and SMTP. As mentioned above, APDUs, too, are commands which belong to this layer.

The presentation layer is located below the application layer and includes protocols which transform a system-dependent representation of data into a system-independent form. In this way the syntactically correct data exchange between different systems is ensured.

The session layer is located below the presentation layer and provides for the process communication between two systems. In this layer there are provided services for the organized and synchronized data exchange, which permit for example breakdowns of a data communication session and similar problems to be solved.

These three upper layers thus provide application-oriented services, which permit the applications of a system to carry out the data communication with applications of a different system. The following four lower layers of the OSI reference system model, however, are transport-oriented layers. They provide services which permit establishing a data communication connection between the two systems and the data transmission between the systems.

The tasks of the transport layer comprise the segmentation and the avoidance of jams during the data transmission. It is the bottom layer in the OSI reference model which provides a complete end-to-end communication between sender and receiver of a data transmission. Thus, it is possible for the layers thereabove to be provided with services for the data communication which hide the properties of the current communication network. The transport layer comprises e.g. communication protocols such as TCP ("transmission control protocol") and UDP ("user datagram protocol").

The communication protocols of the network layer located below the transport layer include services for the switching of connections and the forwarding of data packets from one computer to the next along a path from the sender to the receiver (point-to-point connection). The routing, i.e. the path search for data packets to be sent from one computer to the next, is also a task of the network layer. Important protocols of this layer are the various versions of the IP ("Internet protocol"), IPv4, IPv6.

It is task of the data link layer located below the network layer to ensure a largely error-free data transmission and to control access to the transmission medium. For this purpose serves e.g. the division of a bitstream to be transmitted into blocks, the addition of checksums and the like. Acknowledgement mechanisms indicate e.g. a loss of data blocks and permit a retransmission of the same.

The physical layer as the bottom-most layer of the OSI reference model provides mechanical, electrical and further functional aids to activate and deactivate physical connections and to transmit bits as information units.

Similar to the OSI reference model which was created for structuring general network communication protocols, there exists the TCP/IP reference model for structuring the special communication protocols used in the Internet protocol family. About 500 communication protocols which constitute a base for the data communication in the Internet are summarized in the Internet protocol family. Often, and also in connection with the present invention, the Internet protocol family is referred to as TCP/IP protocol family.

The TCP/IP reference model is built-up hierarchically like the OSI reference model. It roughly represents an equivalent of the OSI reference model for the limited quantity of the communication protocols of the TCP/IP protocol family and possesses only four layers, which in FIG. 4 are compared to the roughly corresponding layers of the OSI reference model. The tasks of the protocols in the particular layers of the TCP/IP reference model correspond to the accordingly compared tasks of the OSI reference model described hereinabove.

The application layer as the top-most layer of the TCP/IP reference model approximately corresponds to the three upper layers of the OSI reference model. The transport layer of the TCP/IP reference model located therebelow corresponds to the transport layer of the OSI reference model. Likewise, the Internet layer of the TCP/IP reference model again located therebelow corresponds to the network layer of the OSI reference model. The bottom-most link layer of the TCP/IP reference model comprises the data link layer and the physical layer of the OSI reference model.

The TCP/IP reference model thus is more coarsely structured than the OSI reference model. Here, the description of the tasks of a communication protocol of a TCP/IP reference model's layer is not determined as exact as in the OSI reference model. The link layer is specified in the TCP/IP reference model, but according to common interpretation does not contain any protocols of the TCP/IP protocol family. It is rather provided as a placeholder for various data transmission techniques which fulfill the tasks which were described hereinabove with reference to the data link layer and the physical layer of the OSI reference model. There also are communication protocols of the TCP/IP protocol family which cannot be unequivocally assigned to a layer, because they fulfill partial tasks of a plurality of layers at the same time. Within the framework of the TCP/IP reference model it is allowed that a protocol of a layer uses services of protocols of all layers located therebelow.

In the TCP/IP reference model a TCP/IP protocol stack refers to an amount of communication protocols from the TCP/IP protocol family together with a suitable protocol from the link layer, the protocol stack comprising at least one suitable protocol from each layer of the TCP/IP reference model. Therefore, a data communication between two systems via the Internet is possible, when each of the two systems is provided with a TCP/IP protocol stack and a connection to the Internet can be physically established. Normally, the software which provides the particular communication protocols of a TCP/IP protocol stack on a system is part of the operating system of the particular system.

There are known chip cards with Internet functionality which comprise a TCP/IP protocol stack. Thus it is possible to directly access Internet-specific applications of such a chip card, for example a web server application, from a computer in the Internet using communication protocols from the TCP/IP protocol family. Such a data communication exclusively takes place using communication protocols of the TCP/IP protocol family, i.e. in particular without the use of APDUs. Such chip cards may be used for example as security elements in e-banking transactions for the protection against phishing attacks. But conventional chip card applications of such a chip card which are based on a data communication by means of APDUs are to be supported still further.

Normally, the data for such a chip card, which processes APDUs as well as further data such as e.g. commands of a communication protocol from the application layer according to the TCP/IP reference model for special Internet functionalities, are transmitted via a joint data communication interface, for example a USB interface. So as to permit the commands to be forwarded to the assigned processing applications on the chip card, APDUs and the Internet protocol commands transmitted by means of a TCP/IP data stream have to be identified as such and forwarded to the proper place. It is the only way to ensure that APDUs reach the corresponding chip card applications and for example HTTP commands a web server application on the chip card.

WO 2006/032993 A2 describes a chip card for insertion into a mobile telephone terminal. The chip card takes over, among other things, the tasks of a SIM mobile telephone card and additionally comprises a TCP/IP protocol stack. Commands for the data communication with SIM functionalities have the form of APDUs. APDUs arriving at a data communication interface of the chip card are separated from other commands, e.g. HTTP commands, by a module set up therefor. The functionality which carries out the separation of APDUs from the remaining data traffic in the module is assigned to the link layer of the TCP/IP reference model, i.e. to the bottom-most layer.

In the case of chip cards which have a USB interface, APDUs are treated via a special USB device class (USB-ICCD). The USB device class defines how the systems communicate with each other via the USB interface. In this case APDUs are also separated from the remaining arriving data traffic in the link layer by means of a special functionality of this device class.

A separation of the APDUs from the remaining arriving data traffic in the link layer or generally by means of communication protocols specifically adapted thereto normally require an intervention in the particularly involved communication protocol, i.e. an intervention in the operating system of the system. Therefore, with respect to this separation functionality existing systems cannot or only with difficulties be converted or adapted.

SUMMARY

It is therefore the object of the present invention to separate in a simple fashion data of a data stream intended for a data carrier in APDUs and Internet protocol commands.

This object is achieved by a method and a data carrier having the features of the independent claims. Advantageous embodiments and developments are specified in the dependent claims.

The present invention is based on the basic idea to transmit the APDUs together with the Internet protocol commands in one TCP/IP data stream and to separate the APDUs and the Internet protocol commands from each other above the transport layer of the TCP/IP reference model by an allocator application. The allocator application is arranged above the transport layer and uses only standard services of the transport layer or the application layer. In an embodiment an allocator unit can be realized as an integral component of the chip card's operating system. In said embodiment the functionality of the allocator in the interaction with the protocol stack or a server can be combined in the operating system and thus not necessarily is an independent application. When in the following an allocator application is mentioned, more general, an allocator unit can also be meant.

Accordingly, a method according to the invention for the data communication between a portable data carrier and an external communication device, which each comprise a TCP/IP protocol stack, comprises at first the step of sending communication data from the communication device to the data carrier, the communication data comprising at least commands according to an Internet protocol of the application layer of the TCP/IP reference model and commands in the form of APDUs according to ISO/IEC 7816-4. Additionally, the method comprises the steps of transmitting the communication data between the communication device and the data carrier, of receiving the communication data by the data carrier, and of separating the received APDUs and the received Internet protocol commands from each other by means of the allocator application of the data carrier. The mentioned commands here are transmitted by means of TCP/IP, i.e. in one TCP/IP data stream, the allocator application separates the APDUs and the Internet protocol commands from each other not until above the transport layer of the TCP/IP reference model.

A data carrier according to the invention accordingly comprises a TCP/IP protocol stack, a data communication interface for the data communication with an external communication device, and an allocator device. The allocator device separates commands according to an Internet protocol and commands in the form of APDUs, which are contained in communication data received via the data communication interface and transmitted by means of TCP/IP, by means of an allocator application having the features described hereinabove.

A separation of APDUs and Internet protocol commands in the described fashion does not require any adaptation of conventional communication protocols of the data carrier's TCP/IP protocol stack and in particular not any adaptation of the operating system routines. The allocator application at any time can be dynamically set up and adapted on each data carrier having a usual TCP/IP protocol stack. For separating the commands the allocator application itself uses at most standardized services of the application layer or of the transport layer. I.e., in any case it is arranged above the transport layer, because this is the lowest layer from which the allocator application, if necessary, uses services. The method thus permits Internet protocol commands and APDUs to be transmitted via a joint TCP/IP data stream to the data carrier and the APDUs to be separated in a simple fashion from the Internet protocol commands in the data carrier.

In connection with the present invention a TCP/IP data stream generally refers to data which by means of the communication protocol IP from the Internet layer and of the communication protocol TCP from the transport layer located thereabove are transmitted between two communication partners, and also, according to the terminology used herein, when the data, for example HTTP commands, have reached the application layer above the transport layer. At the level of the transport layer the TCP/IP data stream is specifically referred to as TCP data stream.

According to a first embodiment, the APDUs are transmitted by the communication device by means of the TCP protocol in the TCP data stream without embedding them in further control data or auxiliary data from a higher protocol layer. In this case the allocator application is formed as a so called socket application via which the APDUs are received. A socket is a service of the TCP protocol for establishing a connection-oriented data communication between two computers. The allocator application can request a socket via the operating system and thereupon can receive and send data via this socket. Such a socket usually is addressed via an IP address and a number, the so-called port. The port for receiving APDUs is to be determined here as a fixed port number reserved for this application, as it is known from the so-called "well-known-ports" for standard applications. E.g., for HTTP the port with the number 80 is reserved. The allocator application now is set up to receive APDUs arriving at this determined port. The communication device in turn knows the IP address of the data carrier and the determined port number at which the allocator application awaits APDUs, and for sending APDUs it can connect itself with the socket and send APDUs to the socket. Thus, APDUs can be separated from the remaining data stream in a simple fashion by the allocator application, by the APDUs being addressed to the socket with the determined port number.

According to a second embodiment, the communication device embeds the APDUs in HTTP commands. An embedded APDU can be marked in the header of the particular HTTP command for example through a corresponding "content type" entry. Such a "content-type" entry generally marks the data type of the data which are transmitted by means of a HTTP command. The allocator application, which in this embodiment can be formed as a web server application or as a servlet, analyzes received HTTP commands, for example by checking the "content-type" entry in the header of the command, and extracts an APDU contained therein. In this embodiment, too, the allocator application can easily separate APDUs from the remaining TCP/IP data stream.

A third embodiment generalizes the procedure of the second embodiment. The communication device uses here a communication protocol for transmitting the APDUs, which is arranged in the application layer above the HTTP protocol, for example SOAP, which in general uses services of HTTP and TCP. SOAP is a communication protocol with the help of which data are exchanged between systems and "remote procedure calls", i.e. calling applications of a system from a different system, can be carried out. APDUs are embedded in SOAP commands in a suitable fashion and recognized and extracted by the allocator application which is set up to analyze corresponding SOAP commands.

It is also possible that an allocator application supports all three described embodiments. In this way, communication data which are received from differently configured communication devices can be processed in an error-free fashion.

When the allocator application has separated the APDUs from the remaining data stream, it forwards these and received Internet protocol commands to processing applications assigned thereto. That is, an APDU is forwarded to a conventional chip card application, a HTTP command to a web server application. The assigned processing applications process the forwarded commands and in turn send response commands to the forwarded commands. These response commands are received by the allocator application and sent back to the communication device. Preferably, the allocator application sends back the response commands to the communication device in the form in which it has received the commands from the communication device before.

Preferably, the allocator application can process a plurality of received commands, APDUs or Internet protocol commands in parallel. That is, the allocator application can forward a command to the assigned processing application even when the allocator application has not yet received a response from this or another processing application to a command forwarded to this or another processing application before. This prevents a processing application from keeping other processing applications in the data carrier from processing their commands through delayed response to a command.

It is possible that the allocator application is provided as an endpoint for an encrypting protocol. That is, certificates, authentication keys, session keys and the like are managed by the allocator application and respective encrypting methods are supported. In so doing, commands received from the communication device are decrypted by the allocator application before the forwarding to the processing application. Likewise, response commands received from the processing application are correspondingly encrypted before the sending to the communication device.

An allocator application can be a JAVA card applet—in particular for JAVA card 3.0. By loading the applet in a conventional JAVA card later, the mentioned advantages can also be provided later.

Preferably, the data carrier is an Internet-capable chip card having a web server application. By means of the method described hereinabove then even conventional chip card applications of the chip card can be addressed and approached by a computer in the Internet via TCP/IP.

BRIEF DESCRIPTION OF THE DRAWINGS

In the following the invention is described by way of example with reference to the accompanying Figures.

DETAILED DESCRIPTION OF VARIOUS EMBODIMENTS

Figure 1:
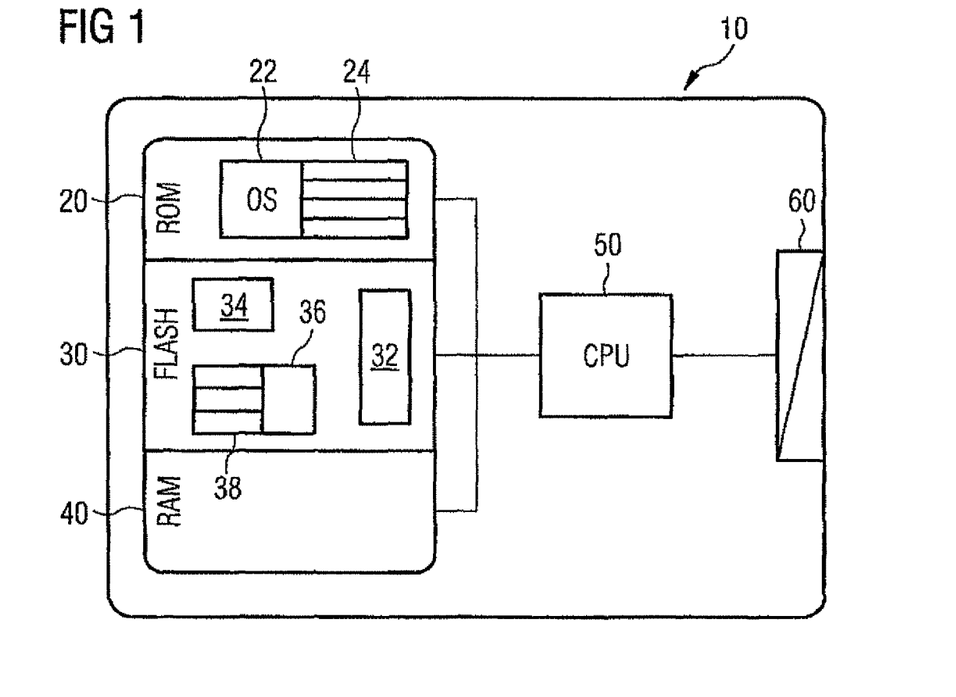
FIG. 1 shows a preferred embodiment of a data carrier according to the invention.

With reference to FIG. 1, a portable data carrier 10 formed as a chip card comprises a data communication interface 60 in the form of a USB interface, a processor (CPU) 50, a ROM memory 20, a FLASH memory 30, and a main memory (RAM) 40.

Via the USB interface 60 the chip card 10 communicates with external data processing devices, for example a personal computer (PC). Instead of or in addition to the contact-type USB interface 60 the chip card 10 can also have a contactless data communication interface, e.g. an antenna coil. Instead of USB as a transmission protocol of the link layer, there can also be used a different protocol.

The processor 50 controls the chip card 10 by means of the operating system 22 stored in the not rewritable ROM memory 20, which comprises a TCP/IP protocol stack 24. The TCP/IP protocol stack 24 and parts of the operating system 22 or also the entire operating system 22 can be alternatively stored in the rewritable FLASH memory 30.

In the FLASH memory 30 there are stored an allocator application 32, a web server application 34 and various conventional chip card applications 38 which receive their commands via a distributor application 36. The memory 30 can also be formed as an EEPROM memory or the like. The applications 32, 34, 36, 38 mentioned hereinabove are described in more detail with reference to the FIGS. 2 and 3. Further applications and data (not shown) can be stored in the memory 30, for example certificates or authentication keys and encrypting applications.

Figure 2:
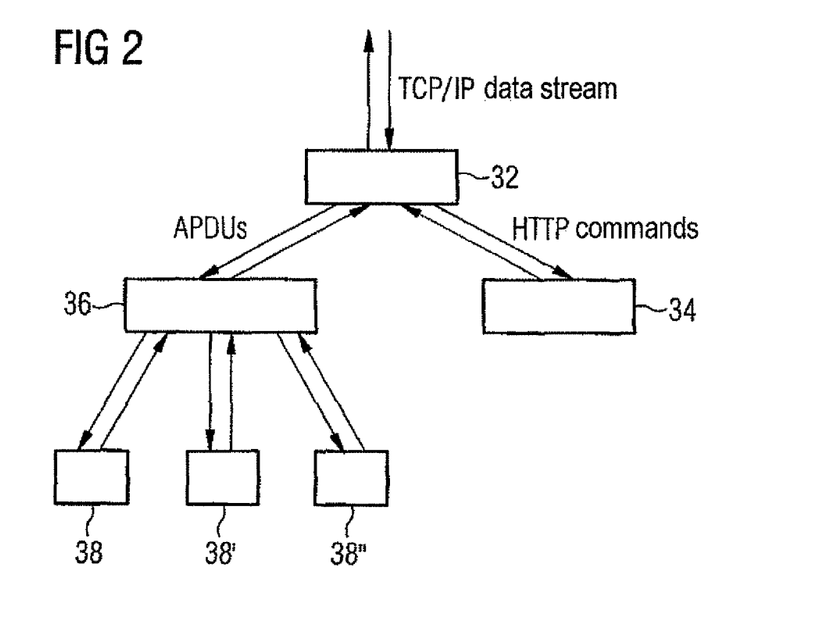
FIG. 2 shows the flow of transmitted data according to an embodiment of the method according to the invention.

By means of the TCP/IP protocol stack 24 the chip card 10 can receive commands from data processing units via the Internet in the form of a TCP/IP data stream, as it is shown in FIG. 2. The data transmitted with the TCP/IP data stream via the USB interface 60 may contain APDUs according to ISO/IEC 7816-4 which are processed and returned by the chip card applications 38. Commands according to an Internet protocol of the TCP/IP reference model's application layer contained in the TCP/IP data stream are processed and returned by the web server application 34. The allocator application 32 separates the APDUs from the remaining commands. Various embodiments of the allocator application 32 are described in more detail in the following with reference to the FIGS. 3A-3C.

When the allocator application 32 has recognized and extracted an APDU in the TCP/IP data stream, it forwards this APDU to a buffer memory (not shown) of the distributor application 36. The distributor application 36 then removes the APDU from the buffer memory and passes it on to the chip card application 38 addressed by the APDU. The allocator application 32 can store a plurality of received APDUs in the buffer memory, which then are successively removed by the distributor application 36 and forwarded to the chip card applications 38, 38', 38". When the chip card application 38 has processed the APDU, it sends a response APDU to the distributor application 36, which in turn forwards the response APDU to the allocator application 32. The allocator application 32 may also be provided with a buffer memory in which received response APDUs are stored in the meantime before they are sent by the allocator application 32 via a TCP/IP data stream and via the USB interface 60 to the corresponding receiver. Advantageously, the allocator application 32 can also take over the tasks of the distributor application 36.

For this purpose the allocator application 32 is formed for example in a multithreading-capable fashion and thus set up to manage a plurality of APDUs and corresponding response APDUs in parallel. For example, it can forward an APDU to the chip card application 38', although it has not yet received a response APDU to an APDU forwarded to the chip card application 38 before.

Internet protocol commands from the TCP/IP data stream, for example HTTP, FTP or SSH commands, are forwarded by the allocator application 32 to the web server application 34. This takes place in parallel to the forwarding of the APDUs to the distributor application 36 or the chip card applications 38, 38', 38". The web server application 34 processes the commands and sends corresponding response commands which are received by the allocator application 32 and forwarded via a TCP/IP data stream to the addressed receiver.

The allocator application 32 at the same time is an endpoint for encrypting protocols, e.g. SSL/TLS ("secure socket layer", "transport layer security") or SCM. SSL/TLS is an encrypting protocol which according to the TCP/IP reference model is arranged above TCP and below HTTP and serves to encrypt data transmitted via the Internet. SCM stands for "secure messaging" and serves to encrypt APDUs. The allocator application 32 is set up to access securely stored keys or certificates and to carry out encrypting routines and decrypting routines. All commands received in an encrypted fashion by the allocator application 32, APDUs and Internet protocol commands, are decrypted by the allocator application 32 before the forwarding to the distributor application 36 or the web server application 34. Likewise, response commands received from these applications are encrypted by the allocator application 32 before the sending to the respective addressee. It is also possible that only APDUs or only Internet commands are encrypted and decrypted at the level of the allocator application 32 and that the encrypting of the other commands is carried out in the respective processing application 34, 38 itself, or else that all encrypting applications are carried out in the processing applications 34, 38.

Figure 3A:
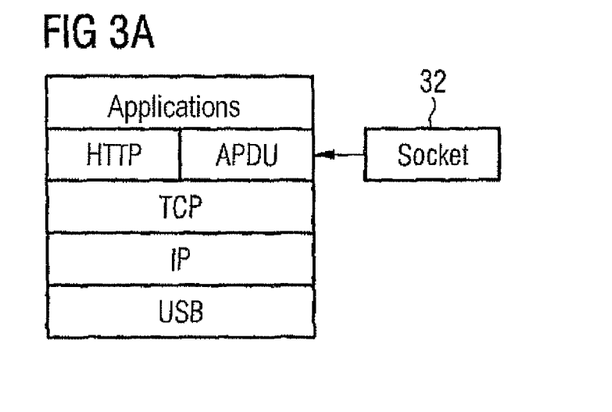
FIG. 3A shows an arrangement of an allocator application according to a first preferred embodiment of the method in relation to a TCP/IP protocol stack.
Figure 3B:
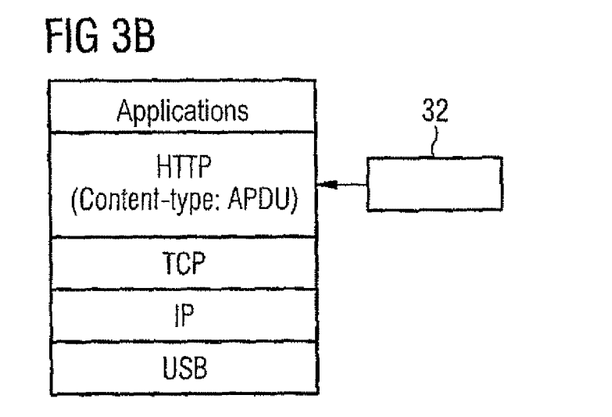
FIG. 3B shows the arrangement of the allocator application according to a second preferred embodiment.
Figure 3C:
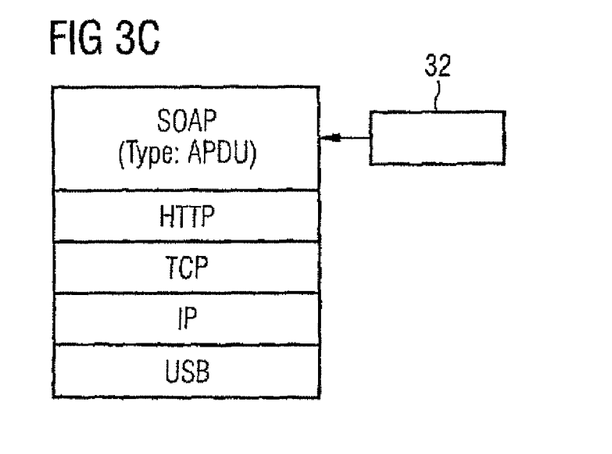
FIG. 3C shows the arrangement of the allocator application according to a third preferred embodiment.

With reference to the FIGS. 3A, 3B and 3C there are described preferred embodiments of the allocator application 32, and it is explained which services from which layers of the TCP/IP protocol stack are used therefor in each case.

The allocator application 32 can be realized, as shown in FIG. 3A, by means of a socket communication as a so called socket application. The data communication via a socket is provided as a service directly by TCP, i.e. a protocol from the TCP/IP protocol stack 24 of the chip card 10. The TCP is located in the transport layer of the TCP/IP reference model. The allocator application 32 generates a socket, via which, as described in the following, the receiving of the APDUs and the sending of the response APDUs is carried out. This is, the allocator application 32 thus uses a service of the transport layer, concretely, a service of the TCP, namely a socket for establishing a data communication connection. The allocator application therefore can be considered to be located above the transport layer. A socket can be addressed by a client application on an external device via a given address assigned to the socket upon the generation of the socket. In the case of a data communication via TCP/IP this address usually includes the IP address of the chip card 10 and a port number. With the "list" command the allocator application 32 waits at the socket for connection requests of a client application. Such a connection can be established by the client application by means of the "connect" command when the IP address and the port number are known. The client application then by means of the "send" command sends an APDU via the connected socket which is received by the allocator application 32 by means of the "recv" command. Vice versa, the allocator application 32 by means of "send" sends the response APDU which is received by the client application by means of "recv".

As shown with reference to FIG. 3B, the allocator application 32 can also be realized as a separate web server application or as a servlet, which comprises a HTTP interface, e.g. JavaCard 3 servlet API. The allocator application thus is arranged above the application layer, because it only accesses commands of the HTTP protocol, i.e. of a protocol of the application layer. An allocator application 32 formed in this fashion is set up to recognize and extract APDUs which are embedded in HTTP commands. A HTTP command in which an APDU is embedded can be marked in such a way that e.g. in the header of the command in the field "content-type" a corresponding entry "apdu" or the like is entered. When the allocator application 32 receives such a HTTP command, it extracts the APDU and forwards it to the distributor application 36. The HTTP command itself is not forwarded to the web server application 34, because it was only provided as a carrier for the APDU. The allocator application 32 again embeds the response APDU received from the distributor application 36 in a carrier HTTP command and sends this HTTP command to the corresponding addressee. As carrier HTTP commands there serve e.g. "POST" and "GET", for the servlet "doPost" and "doGet", respectively. If, however, the allocator application 32 receives a HTTP command in which no APDU is embedded, this HTTP command will be directly forwarded to the web server application 34.

FIG. 3C illustrates an allocator application 32 which is set up to recognize and to extract APDUs transmitted by means of SOAP. For transmitting the APDU via the TCP/IP data stream there can also be used different communication protocol above HTTP. For marking the APDU in the SOAP command, there can be used any suitable mechanisms, for example identifiers similar to the "content-type" identifier of FIG. 3B. The allocator application analyzes the SOAP command, identifies an embedded APDU according to defined rules and after the extraction forwards this APDU to the distributor application 36. The allocator application 32 only accesses SOAP commands, i.e. commands of the application layer, and thus is arranged above the application layer. Similar to the second embodiment of FIG. 3B, the allocator application 32 embeds the response APDU received from the distributor application 36 in a suitable carrier SOAP command and correspondingly sends it.

It can also be provided that the allocator application 32 is implemented on the chip card 10 such that it supports all three embodiments described with reference to the FIGS. 3A-3C.

The invention claimed is:

1. A method for the data communication between a portable data carrier and an external communication device, wherein the data carrier and the communication device in each case comprise a TCP/IP protocol stack, comprising the steps:

sending communication data from the communication device to the data carrier, the communication data comprising at least commands according to an Internet protocol of the application layer of the TCP/IP reference model and commands in the form of APDUs according to ISO/IEC 7816-4;

transmitting the communication data from the communication device to the data carrier;

receiving the communication data by the data carrier; and separating the received APDUs and the received Internet protocol commands from each other by means of an allocator unit of the data carrier;

wherein the received APDUs and the received Internet protocol commands are both transmitted by means of TCP in a transport layer of the TCP/IP reference model from the communication device to the data carrier, and wherein the allocator unit of the data carrier carries out the separation of the received APDUs and the received Internet protocol commands only above said transport layer of the TCP/IP reference model.

2. The method according to claim 1, wherein the allocator unit is configured as a socket application which extracts the received APDUs from a TCP data stream.

3. The method according to claim 1, wherein the communication device embeds the APDUs in HTTP commands and the allocator unit is configured as a web server application or as a servlet which analyzes received HTTP commands and extracts the APDUs embedded in HTTP commands.

4. The method according to claim 1, wherein, for transmitting the APDUs, the communication device uses a communication protocol which with respect to the TCP/IP reference model that is arranged above the HTTP protocol and the allocator unit analyzes the received communication data according to this communication protocol and extracts the APDUs contained therein.

5. The method according to claim 1, including the further steps after the separation of the Internet protocol commands from the APDUs:

forwarding the separated Internet protocol commands and APDUs to assigned processing applications of the data carrier by the allocator unit;

receiving a response to the forwarded commands from the processing application by the allocator unit; and sending the responses to the communication device by the allocator unit.

6. The method according to claim 5, wherein the allocator unit, upon the step of forwarding the commands, forwards a command to a processing application even when the allocator unit has not yet received a response from this or another processing application to a command forwarded earlier to this or another processing application.

7. The method according to claim 5, wherein the allocator unit decrypts an Internet protocol command received in encrypted form and/or an APDU received in encrypted form before the forwarding to the associated processing application and encrypts the response received from the processing application before the sending to the communication device.

8. The method according to claim 1, wherein the allocator unit is an allocator application which is later loadable onto the portable data carrier.

9. A portable data carrier, comprising:

a TCP/IP protocol stack, a data communication interface enabling data communication with an external communication device, an allocator unit which is arranged to separate from each other commands according to an Internet protocol of the application layer of the TCP/IP reference model and commands in the form of APDUs according to ISO/IEC 7816-4, wherein the Internet protocol commands and the APDUs are both transmitted by means of TCP in a transport layer of the TCP/IP reference model and both contained in communication data received via the data communication interface from the communication device, wherein the allocator unit of the data carrier is configured to carry out the separation of the received APDUs from the received Internet protocol commands only above said transport layer of the TCP/IP reference model.

10. The data carrier according to claim 9, wherein the allocator unit is configured as a socket application and that extracts from a TCP data stream APDUs.

11. The data carrier according to claim 9, wherein the allocator unit is configured as a web server application or as a servlet to extract APDUs embedded in HTTP commands.

12. The data carrier according to claim 9, wherein the allocator unit is configured to analyze communication data transmitted by means of a communication protocol which with respect to the TCP/IP reference model is arranged above the HTTP protocol and to extract APDUs contained therein.

13. The data carrier according to claim 9, wherein the allocator unit is further arranged to forward the Internet protocol commands and APDUs to assigned processing applications of the data carrier, to receive responses to the forwarded commands from the processing application, and to send the responses to a communication device.

14. The data carrier according to claim 13, wherein the allocator unit is arranged to forward a command to a processing application even when the allocator unit has not yet received a response from this or another processing application to a command forwarded earlier to this or another processing application.

15. The data carrier according to claim 13, wherein the allocator unit is arranged to decrypt an Internet protocol command received in encrypted form and/or an APDU received in encrypted form before the forwarding to the assigned processing application and to encrypt a response received from the processing application before the sending to a communication device.

16. The data carrier according to claim 9, wherein the data carrier is an Internet-capable chip card having web server application.

17. The data carrier according to claim 9, wherein the allocator unit is an allocator application which is loadable onto the portable data carrier later.

\* \* \* \* \*